(12) United States Patent
Dailey et al.

(10) Patent No.: US 7,234,917 B2
(45) Date of Patent: Jun. 26, 2007

(54) ROTARY APPARATUS FOR A GAS TURBINE ENGINE (75) Inventors: Geoffrey M Dailey, Derby (GB); Martin G Rose, Derby (GB)

(73) Assignee: Rolls-Royce plc, London (GB)

( * ) Notice: Subject to any disclaimer, the term of this patent is extended or adjusted under 35 U.S.C. 154(b) by 179 days.

(21) Appl. No.: 11/041,269

(22) Filed: Jan. 25, 2005

(65) Prior Publication Data
US 2005/0244265 A1 Nov. 3, 2005

Related U.S. Application Data (63) Continuation of application No. 09/768,591, filed on Jan. 25, 2001, now Pat. No. 6,910,855.

(30) Foreign Application Priority Data
Feb. 2, 2000 (GB) .................................. 0002257.4

(51) Int. Cl.
*F01D 17/16* (2006.01)
(52) U.S. Cl. ....................................... 415/151; 415/167
(58) Field of Classification Search ................ 415/151, 415/156, 155, 159, 162, 191, 161
See application file for complete search history.

(56) References Cited

U.S. PATENT DOCUMENTS 1,462,483 A * 7/1923 Carpenter .................... 415/164
5,372,485 A * 12/1994 Sumser et al. ............... 417/407

* cited by examiner

*Primary Examiner*—Igor Kershteyn
(74) *Attorney, Agent, or Firm*—W. Warren Taltavull; Manelli Denison & Selter PLLC (57) ABSTRACT

Rotary apparatus for a gas turbine engine comprises a rotor assembly and first and second stator assemblies mounted coaxially with respect to each other. The first stator assembly is upstream of the second stator assembly, and the second stator assembly is upstream of the rotor assembly. The rotor assembly comprises an annular array of rotor blades, and each stator assembly comprises an annular array of stator vanes. Each vane has a leading edge and a trailing edge. The stator assemblies are circumferentially translatable relative to each other between a first condition and a second condition. In the first condition, at least a part of each vane of the second stator assembly extends beyond the trailing edge of the respective vane of the first stator assembly.

30 Claims, 6 Drawing Sheets

ROTARY APPARATUS FOR A GAS TURBINE ENGINE

This application is a continuation of application Ser. No. 09/768,591 filed Jan. 25, 2001 and now U.S. Pat. No. 6,910,855.

FIELD OF THE INVENTION

This invention relates to rotary apparatus for gas turbine engines. In particular, but not exclusively, the invention relates to intermediate pressure turbines.

BACKGROUND OF THE INVENTION

In a three shaft gas turbine engine, in which the intermediate pressure compressor is driven by the intermediate pressure turbine, the design of the intermediate pressure compressor is dominated by its performance at low power. Attempts have been made to enable the capacity of the intermediate pressure turbine to vary with the power of the engine, but these generally require large numbers of working parts, making the turbines prone to maintenance problems and expensive.

SUMMARY OF THE INVENTION

According to one aspect of this invention there is provided a rotary apparatus for a gas turbine engine, the apparatus comprising first and second stator assemblies and a rotor assembly mounted coaxially with respect to each other, the first stator assembly being upstream of the second stator assembly, and the second stator assembly being upstream of the rotor assembly, the rotor assembly comprising an annular array of rotor blades, and each stator assembly comprising an annular array of stator vanes, each vane having a leading edge and a trailing edge wherein the vanes of one of the stator assemblies are movable relative to the vanes of the other of the stator assemblies between a first condition in which each of the vanes of the second stator assembly is substantially in aerodynamic alignment with a respective one of the vanes of the first stator assembly, and the exit angle of gas from the stator assemblies is relatively high, and a second condition in which the exit angle of gas from the stator assemblies is relatively low. Thus, in the first condition, at least a part of each vane of the second stator assembly extends beyond the trailing edge of the respective vane of the first stator assembly.

The rotary apparatus may be a turbine, preferably an intermediate pressure turbine. Alternatively, the rotary apparatus may be a compressor.

When the stator assemblies are in the second condition, the vanes of the first and second stator assemblies may be out of aerodynamic alignment with each other.

The first and second stator assemblies are preferably circumferentially translatable relative to each other. The first stator assembly may be fixed and the second stator assembly may be translatable relative to the first stator assembly. Preferably the vanes of the second stator assembly extend downstream beyond the trailing edges of the vanes of the first stator assembly.

The vanes of the first and second stator assemblies are preferably configured such that, in the first condition, the exit angle of the gas from the stator assemblies is controlled by the vanes of the first and the second stator assemblies, whereby said gas is directed, in use, from the stator arrangement at a relatively high exit angle. The configuration of the vanes of the first and second stator assemblies is preferably such that in the second condition, the exit angle of said gas is controlled to a major degree, and preferably substantially wholly, by the vanes of the first stator assembly only, whereby said gas is directed, in use, from the stator arrangement at a relatively low exit angle. The first and second stator assemblies are preferably relatively translatable to any condition intermediate the first and second conditions.

In the first condition, the vanes of the second stator assembly are preferably arranged such that the leading edge of each vane of the second stator assembly is provided in aerodynamic close proximity to, or in abutment with, the trailing edge of the respective vanes of the first stator assembly.

In the second condition, the leading edge of each vane of the second stator assembly is preferably spaced aerodynamically from the trailing edge of the closest vane of the second stator assembly.

Preferably, when the stator assemblies are in the second condition, the vanes of the second stator assembly are arranged intermediate the vanes of the first stator assembly. In one embodiment, the vanes of the second stator assembly are arranged generally parallel, in use, to the flow of gas around the vanes of the first stator assembly. In another embodiment, the vanes of the second stator assembly are arranged substantially mid-way between the adjacent vanes of the first stator assembly.

In one embodiment, the vanes of the second stator assembly are arranged wholly downstream of the vanes of the first stator assembly. In this embodiment, the vanes of the second stator assembly may be translated between the first and second conditions across the trailing edge of the respective vanes of the first stator assembly.

In another embodiment, the leading edge of each vane of the second stator assembly may overlap the trailing edge of a respective one of the vanes of the first stator assembly. In this embodiment, the vanes of the second stator assembly may be translated between the first and second conditions across the respective flow paths defined between adjacent vanes of the first stator assembly.

The first stator assembly may include fixed support means to support the vanes thereof. The second stator assembly may include translatable support means to support the vanes thereof. The translatable support means may comprise an annular member and may be movably mounted on the fixed support means.

The fixed support means may comprise an inner member, which may be annular, extending radially inwardly of the vanes, and may also include an outer member, which may be annular, extending radially outwardly from the vanes. Seal means may be provided between the first and second stator assemblies. Preferably the seal means comprises a seal extending between the fixed support means and the translatable support means. In the preferred embodiment, the seal means comprises a first seal extending between the inner member of the fixed support means and the translatable support means, and between the outer member and the second stator assembly.

The apparatus may include actuating means to effect translation of the second stator assembly.

In one embodiment, a bearing may be provided between the fixed support means and the translatable support means. Preferably, the bearing is provided between the inner member and the translatable support means. The inner member may be provided with a flange extending towards the translatable support means, and the bearing may be provided between the translatable support means and said flange.

Alternatively, connecting members may be provided between the fixed support means and the translatable support means. In one embodiment, the connecting members comprise a plurality of plates which may be arranged circumferentially, preferably substantially uniformly spread, around the stator arrangement extending between the inner member and the translatable support member. Each plate is preferably angled such that it extends substantially parallel to the direction of aerofoil lift on the vanes of the second stator assembly. The plates are advantageously flexible in the circumferential direction to allow movement of the second stator assembly between said first and second conditions.

In another embodiment, the connecting members comprise a plurality of rods pivotally mounted at each end thereof to the respective first and second stator assemblies. Preferably, the rods are mounted to the inner member and to the translatable support means. In this embodiment, the rods are preferably angled to be substantially parallel to the direction of aerofoil lift on the vanes of the second stator assembly.

In an another embodiment, the connecting members comprise a plurality of circumferentially extending struts arranged in compression between the first and second stator assemblies. Preferably between the inner member and the translatable support means. The struts are preferably angled relative to the first and second stator assemblies, such that they are substantially parallel to the direction of aerofoil lift on the vanes of the second stator assembly. In this embodiment, the translatable support means may comprise a flange extending upstream of the second stator assembly, and having thereon a radially outwardly extending lip. The fixable means may include a radially inwardly supporting lip and the struts may extend between said lips.

BRIEF DESCRIPTIONS OF THE DRAWINGS

An embodiment of the invention will now be described by way of example only with reference to the accompanying drawings, in which:—

DETAILED DESCRIPTION OF THE INVENTION

Figure 1:
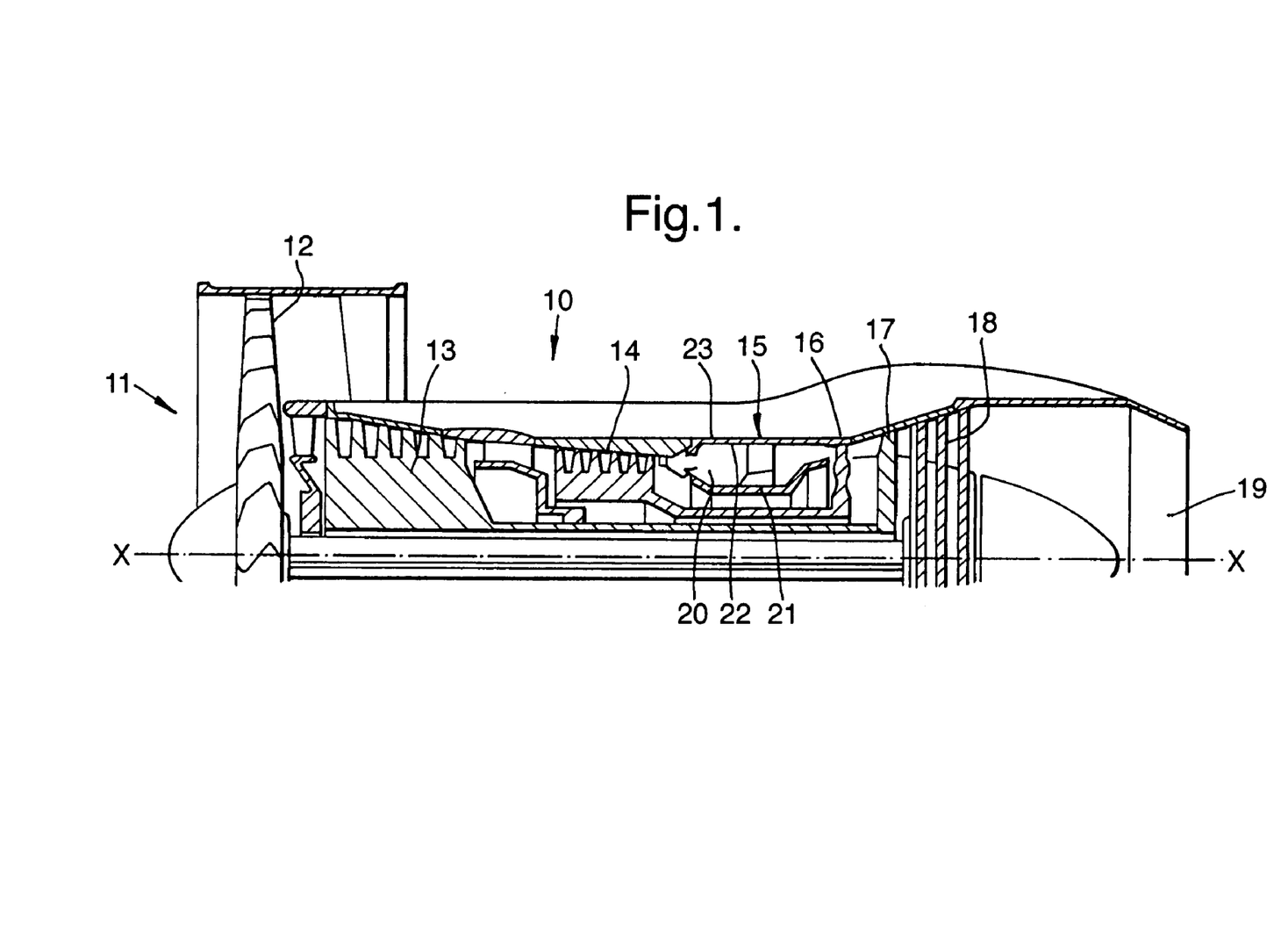
FIG. 1 is a sectional side view of the upper half of a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, combustion equipment 15, a turbine arrangement comprising a high pressure turbine 16, an intermediate pressure turbine 17, a low pressure turbine 18 and an exhaust nozzle 19.

The gas turbine engine 10 works in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbine 16, 17 and 18 respectively drive the high and intermediate pressure compressors 14 and 13, and the fan 12 by suitable interconnecting shafts.

Figure 2:
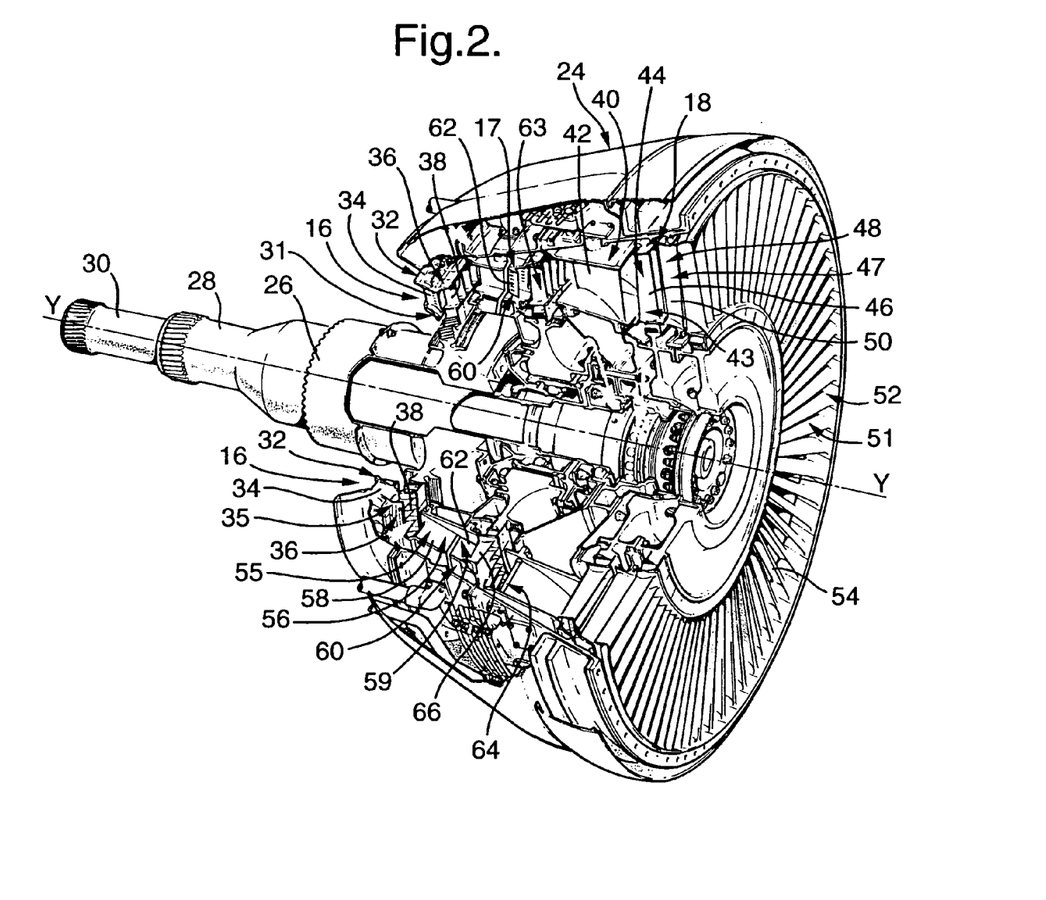
FIG. 2 is a part cut away section of the turbine arrangements of an example of the engine shown in FIG. 1.

Referring to FIG. 2, there is shown an example of a turbine arrangement which comprises a casing 24 surrounding the high, intermediate and low pressure turbines 16, 17 and 18. The turbine arrangement and, consequently, the low intermediate and high pressure turbines having a principal axis Y—Y.

The high and intermediate pressure turbines 16 and 17 are single stage turbines, whereas the low pressure turbine is a multiple stage turbine comprising two stages. The high pressure turbine 16 drives the high pressure turbine shaft 26. The intermediate pressure turbine 17 drives the intermediate pressure turbine shaft 28, and the low pressure turbine 18 drives the low pressure turbine shaft 30.

The high pressure turbine 16 comprises a high pressure stator assembly 31 in the form of an annular array 32 of fixed nozzle guide vanes 34 arranged upstream of a high pressure rotor assembly 35 comprising an annular array 36 of turbine blades 38.

The low pressure turbine 18 comprises a first low pressure stator assembly 39 comprising a first array 40 of nozzle guide vanes 42 arranged upstream of a first upstream low pressure rotor assembly 43 comprising a first array 44 of turbine blades 46. This constitutes the first stage of the low pressure turbine 18. Arranged downstream of the array 44 of rotor blades 46 is a second low pressure stator assembly 47 comprising a second array 48 of fixed nozzle guide vanes 50. Arranged immediately downstream of the fixed nozzle guide vanes 50 is a second low pressure rotor assembly 51 comprising an array 52 of turbine blades 54. The nozzle guide vanes 50 and the turbine blades 54 constitute the second stage of the two stage low pressure turbine 18.

The single stage intermediate pressure turbine 17 comprises a first intermediate pressure stator assembly 55 and a second intermediate pressure stator assembly 59. The first intermediate pressure stator assembly 55 comprises an annular array 56 of fixed nozzle guide vanes 58. Arranged immediately downstream of the fixed nozzle guide vanes 58 is a second intermediate pressure stator assembly 59 comprising an annular array 60 of circumferentially translatable nozzle guide vanes 62. An intermediate pressure rotor assembly 63 is provided immediately downstream of the translatable nozzle guide vanes 62, and comprises an annular array 64 of rotor blades 66.

Figure 3:
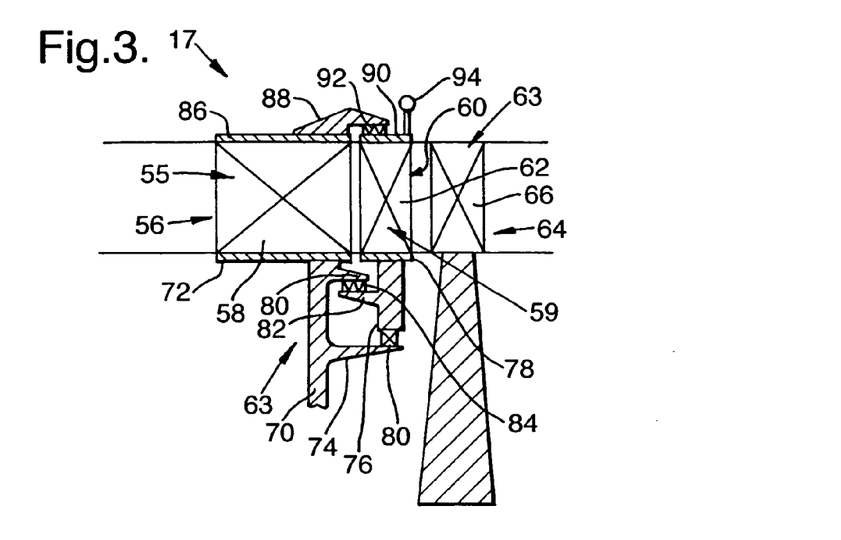
FIG. 3 is a schematic sectional circumferential view of rotary apparatus.

FIG. 3 is a schematic diagram viewed in the circumferential direction of the intermediate pressure turbine 17 shown in FIG. 2.

The first intermediate pressure stator assembly 55 comprises a support arrangement 68 for the fixed nozzle guide vanes 58. The support arrangement 68 comprises a radial support member 70 extending radially inwardly from an inner annular support shroud 72. A first flange 74 extends from the radial support member 70 to provide support for the second intermediate pressure stator assembly 59. The nozzle guide vanes 62 are supported by an annular rim 76. An inner annular shroud 78 is provided on the rim 76 and the translatable nozzle guide vanes 62 are mounted on the shroud 78. A bearing 80 is provided between the rim 76 and the flange 74 to allow circumferential translation of the rim 76 and, correspondingly, of the nozzle guide vanes 62 relative to the flange 74.

A further flange member 80 extends from the support member 44 towards the annular rim 76, and a flange member 82 extends from the annular rim 76 towards the support member 70. The flange members 80, 82 overlap each other and a labyrinth seal 84 is provided therebetween to prevent the leakage of hot air from the turbine 17.

An outer annular shroud 86 is provided on the opposite edge of the fixed nozzle guide vanes 58 to the inner shroud 72. The outer shroud 86 has extending therefrom a flange member 88 which extends across the translatable nozzle guide vane 62. An outer annular shroud 90 is provided on the opposite edges of the translatable nozzle guide vanes 62 to the inner shroud 78, and a labyrinth seal 92 extends between the flange member 88 and the outer shroud 90 to prevent leakage of hot gases.

Actuator means 94, which could be any suitable actuator means known in the art, is provided to effect the circumferential translation of the second intermediate pressure stator assembly 59.

Figure 4:
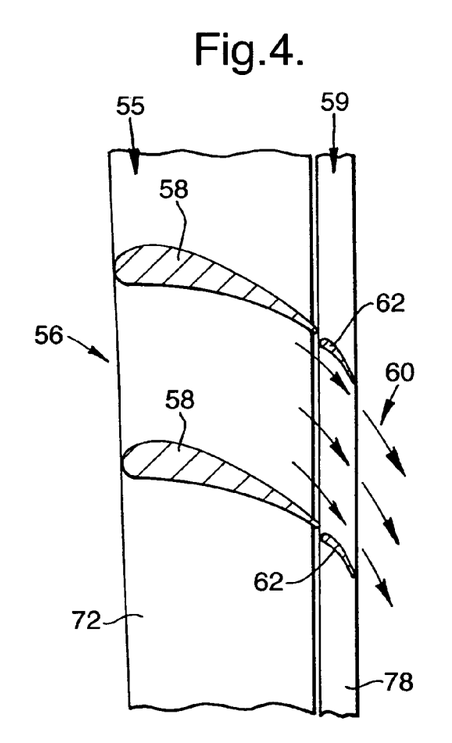
FIG. 4 is a diagrammatic radial view of a stator arrangement in a first condition.
Figure 5:
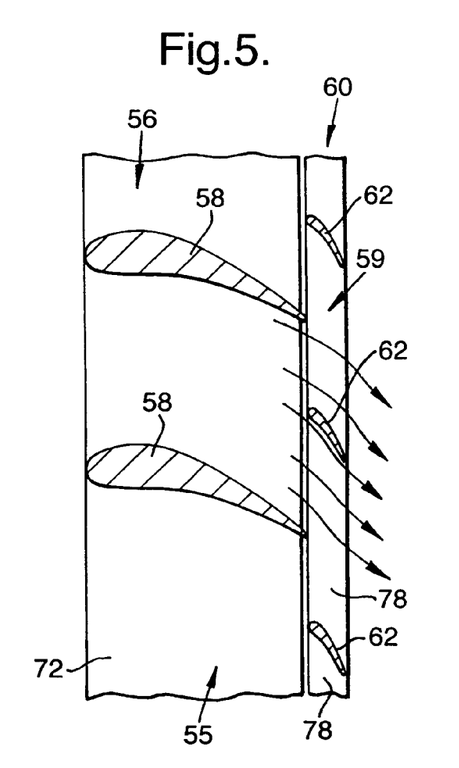
FIG. 5 is a diagrammatic radial view of a stator arrangement in a second condition.

Referring to FIGS. 4 and 5, there is shown schematically the first and second intermediate pressure stator assemblies 55 and 59. The fixed nozzle guide vanes 58 are circumferentially uniformly spaced and supported on the inner shroud 72. However for clarity only two of the fixed nozzle guide vanes 58 are shown. The translatable nozzle guide vanes 62 are similarly circumferentially uniformly spaced from each other, and supported on the inner shroud 78. The pitch between the translatable nozzle guide vanes 62 is approximately equal to the pitch between the fixed nozzle guide vanes 58.

In FIG. 4, the translatable nozzle guide vanes 62 are in a first condition, in which the translatable nozzle guide vanes 62 are arranged in aerodynamic alignment with the fixed nozzle guide vanes 58. As can be seen the translatable nozzle guide vanes 62 extend wholly beyond and downstream of the trailing edges of the fixed nozzle guide vanes 58. In this first condition, air is directed between the nozzle guide vanes 58, 62 by the combination of the configurations of the fixed nozzle guide vanes 58 and the translatable nozzle guide vanes 62 such that the air exits at a high exit angle from the second intermediate pressure stator assembly 59. This represents the normal running condition of the engine and, in this condition, the intermediate pressure turbine is running at low capacity.

Referring to FIG. 5, there is shown the same apparatus as in FIG. 4, but in which the translatable nozzle guide vanes 62 have been translated to the second condition, in which the translatable nozzle guide vanes 62 are disposed in a position intermediate adjacent fixed nozzle guide vanes 58. In this second condition, the air passing through the first and second intermediate pressure stator vane assemblies 55 and 59 directed mainly by the fixed nozzle guide vanes 58. The translatable nozzle guide vanes 62 have little or no effect on the exit angle of the air, and the configuration of the fixed nozzle guide vanes 58 is such that the vanes 58 direct the air at a relatively low exit angle from the second intermediate pressure stator vane assembly 59. This represents the engine running at low power and the intermediate pressure turbine running at a high capacity.

Figure 6:
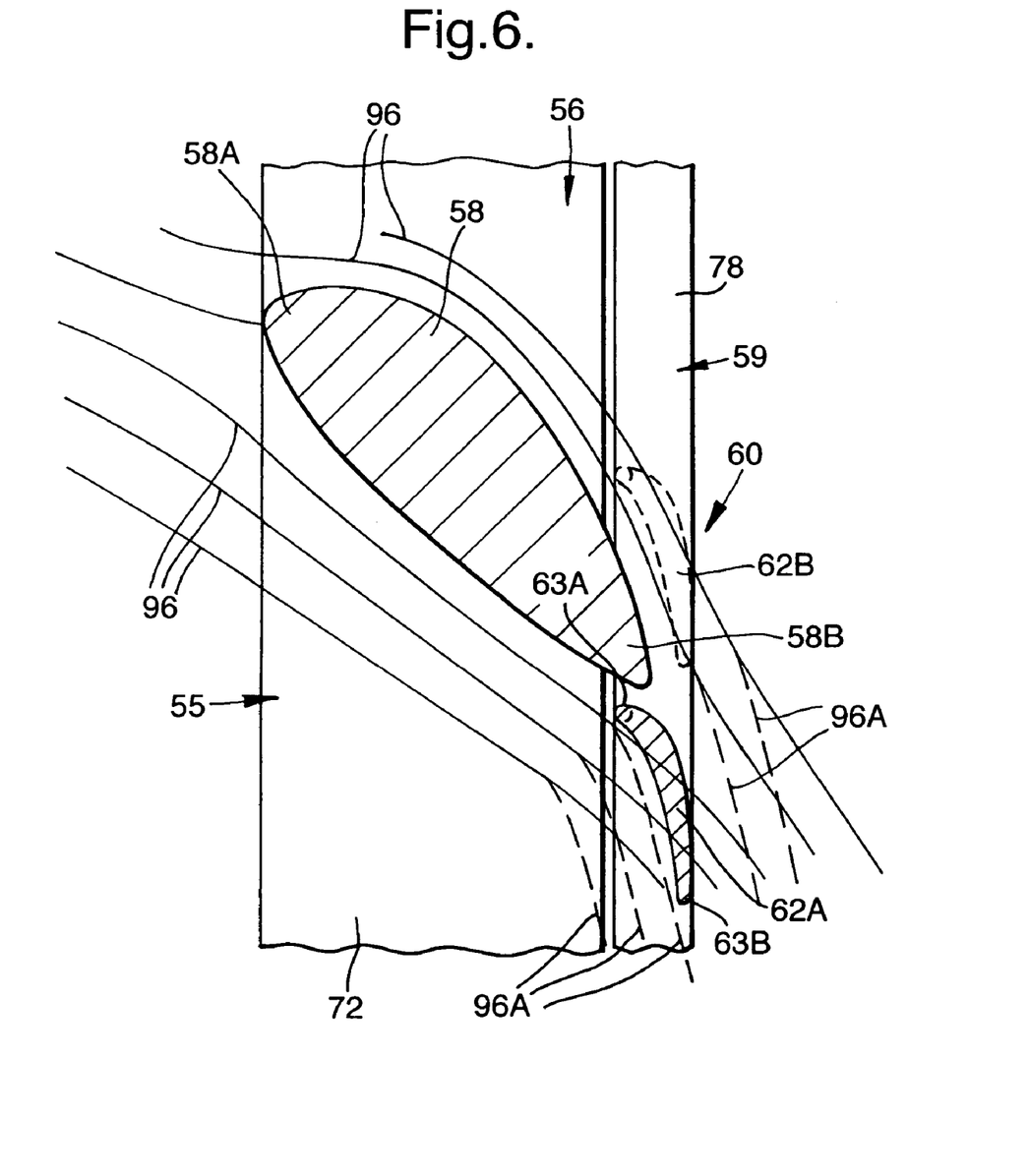
FIG. 6 is a diagrammatic radial view of a further embodiment of a stator arrangement showing the first and second condition.

Referring to FIG. 6, there is shown a modification to the embodiment shown in FIGS. 4 and 5. In FIG. 6, only one fixed nozzle guide vane 58 is shown, having leading and trailing edges 58A and 58B respectively. Also shown are lines 96 representing the direction of flow of air around the nozzle guide vanes 58. The solid lines 96 represent the direction that air would flow if no translatable nozzle guide vanes 62 were present. FIG. 6 also shows two translatable nozzle guide vanes 62. One of the translatable nozzle guide vanes is shown in solid lines and designated 62A. The nozzle guide vane 62A is shown in the first condition. A further nozzle guide vane is shown in dotted lines and designated 62B in FIG. 6. The translatable nozzle guide vane 62B is in the second condition.

In the first condition, the translatable nozzle guide vanes 62, as represented by the nozzle guide vane 62A, are arranged in aerodynamic alignment with the fixed nozzle guide vanes 58, and the combination directs air in the direction shown by the dotted lines 96A. Thus, as can be seen, the air exits from the second intermediate pressure stator assembly 59 at a high exit angle.

When the translatable nozzle guide vane 62 are moved to the second condition, as represented by the nozzle guide vane 62B, the translatable nozzle guide vanes 62B are generally parallel with the direction of flow of air over the fixed nozzle guide vane 58. Thus, in this condition, the air flow substantially follows the solid lines 96 and exits from the annular array 60 at a low exit angle.

As can be seen the leading edge 63A of the translatable nozzle guide vane 62A overlaps the trailing edge of the fixed nozzle guide vane 58, whereas the trailing edge 63B extends beyond and downstream of the trailing edge 58B of the fixed nozzle guide vane 58. Consequently, this embodiment cannot be moved between the first and second conditions by translation across the trailing edge of the fixed nozzle guide vane 58. Instead, the translatable nozzle guide vanes 62 must be moved from the first condition to the second condition and vice-versa across the flow path between adjacent fixed nozzle guide vanes 58.

The provision of two sets of nozzle guide vanes 58, 62 to direct air onto the turbine blades of the intermediate pressure turbine 17 can vary the capacity of the turbine by varying the exit angle of the air from the second intermediate pressure stator assembly 59. The ability to vary the capacity of the intermediate pressure turbine 17 between normal running conditions and lower power of the engine has implications for the design of the intermediate pressure compressor. By varying the capacity of the intermediate pressure turbine, the number of compressor blades can be halved, and it is possible to avoid the use of intermediate pressure compressor variables and bleeds. It would also mean that the high pressure compressor operating point is made almost constant to allow its pressure ratio to be increased without the use of variables.

FIGS. 7 to 11 show various alternative constructions for the support and actuation of the stator vane arrangement 20.

Figure 7:
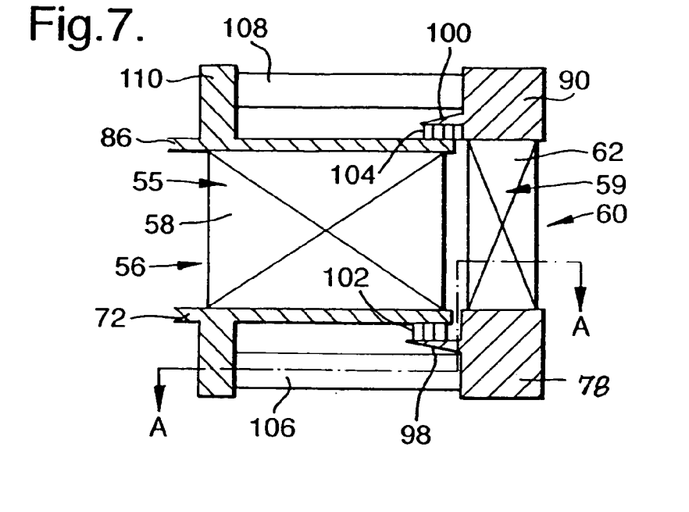
FIG. 7 is a schematic circumferential view of a further embodiment of a stator arrangement.

Referring to FIG. 7, there is shown a modification to the design shown in FIG. 3, in which the same features have been given the same reference numeral. In the embodiment shown in FIG. 7, the translatable nozzle guide vanes 62 are held between concentrically mounted inner and outer annular shrouds 78, 90 each of which has a respective flange 98, 100 extending over the fixed nozzle guide vanes 58. The fixed nozzle guide vanes 58 are held between concentrically mounted inner and outer annular shrouds 72, 86. A labyrinth seal 102 is provided between the flange 98 and the annular shroud 72 and a labyrinth seal 104 is provided between the flange 100 and the outer annular shroud 86.

A plurality of elongate connecting members 106 extend between the inner annular shroud 78 and the support member 79. The connecting members 106 may be arranged at an angle of between 30 and 45° to the principal axis Y—Y of the intermediate pressure turbine 17. This angle corresponds to the direction of aerofoil lift on the translatable nozzle guide vanes 62.

The connecting members 80 are provided radially inwardly of the fixed and translatable nozzle guide vanes 58, 62 and are circumferentially uniformly spaced. A similar array of circumferentially uniformly spaced connecting members 108 is provided radially outwardly of the nozzle guide vanes 58, 62. The connecting members 108 extend between the outer annular shroud 90 and a radially outwardly projecting flange 110 extending from the outer annular shroud 86 of the fixed nozzle guide vanes 58.

The fact that the connecting members 80, 82 are arranged parallel to the direction of lift of the translatable nozzle guide vanes 28, means that the load required to circumferentially translate the translatable nozzle guide vanes 62 is minimized.

Figure 8:
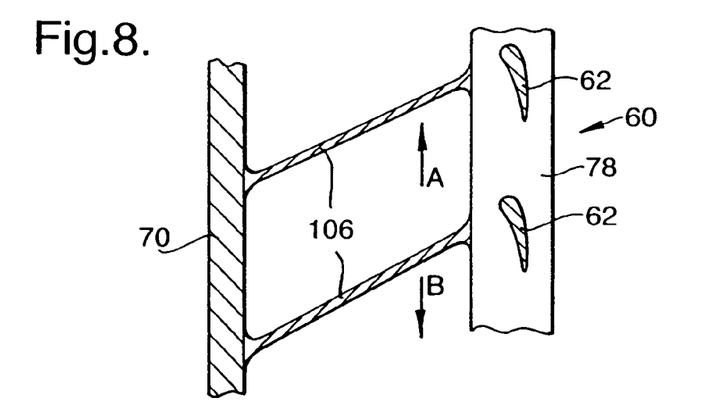
FIG. 8 is one example of the view along the lines A—A in FIG. 7.
Figure 9:
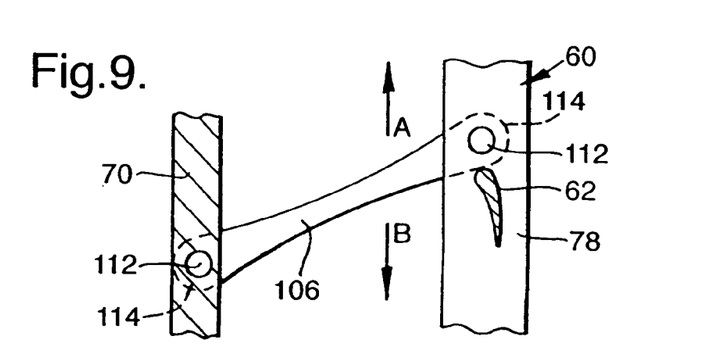
FIG. 9 is a view of an alternative arrangement along the lines A—A in FIG. 7.

FIGS. 8 and 9 are views along the lines A—A in FIG. 7 and show alternative embodiments for the connecting members 106, 108. In FIG. 8, the connecting members 106 are in the form of substantially flat plates fixedly mounted between the support member 70 and the inner annular shroud 78. Similar substantially flat plates (not shown) are connected between the outwardly projecting flange 110 and the outer annular shroud 90. The plates are resiliently deformable in the circumferential direction of the turbine 17. When the actuator (not shown in FIG. 7 or 8) applies a force in the direction indicated by the arrow A to translate the nozzle guide vanes 62 in the same direction, the plates resiliently bend accordingly. When a force is applied by the actuator (not shown) in the opposite direction, indicated by the arrow B, the plates resiliently bend in that direction.

Referring to FIG. 9, the connecting members 106 are in the form of elongate rods pivotally mounted by pivots 112 at their opposite end regions 114 respectively to the support member 70, and to the inner annular shroud 78. When the actuator applies a force to translate the translatable nozzle guide vanes 62 in the direction of arrow A, the rods pivot in the same direction, at their ends 114 to allow the nozzle guide vanes 62 to be translated in that direction. Similarly, when a force is applied by the actuator means in the opposite direction indicated by the arrow B, the rods will pivot about their end 114 in the opposite direction.

Figure 10:
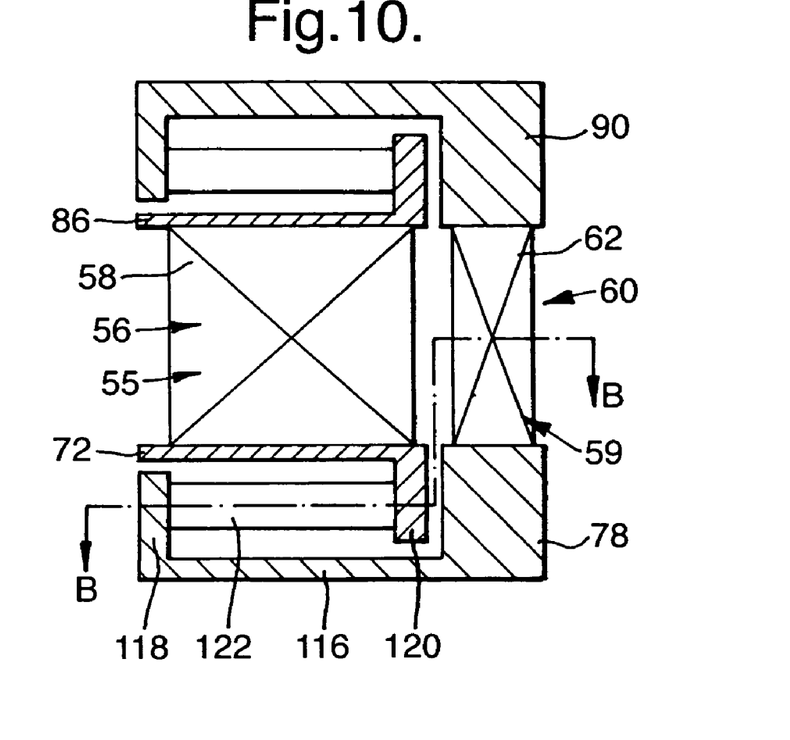
FIG. 10 is a further example of a support for the stator vane arrangement.
Figure 11:
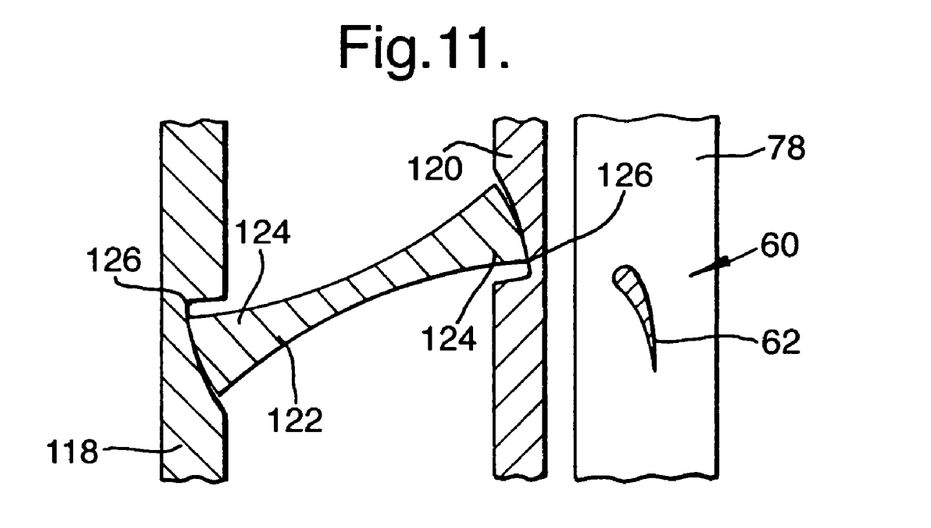
FIG. 11 is one example of the view along the lines B—B in FIG. 10.

Further modifications to the support arrangement for the nozzle guide vanes 58, 62 are shown in FIGS. 10 and 11, in which the inner annular shroud 78 is provided with a flange 116 extending radially inwardly of the nozzle guide vanes 58 and a radially outwardly extending lip 118 extends from the flange 116. Similarly, a radially inwardly extending lip 120 extends from the inner annular shroud 72 of the fixed nozzle guide vanes 58. The lip 120 extends radially inwardly adjacent the inner annular shroud 78. Connecting means in the form of a compression strut 122 (see also FIG. 11) is provided between the lips 118, 114. Each compression strut has widened end regions 124 which are received in correspondingly configured recesses 126 in the lips 118 and 120. The compression struts 122 are each aligned parallel to the direction of aerofoil lift on the translatable nozzle guide vanes 62, and allows the actuator means to move the second stator main assembly 26 in the directions indicated by the arrows A and B.

Various modifications can be made without departing from the scope of the invention, for example other means for connecting the annular member supporting the fixed and translatable vanes 24, 26 may be used. In addition, the use of translatable stator vanes can be applied not just to the intermediate pressure turbine but also to the compressors and other turbines.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A rotary apparatus for a gas turbine engine, the apparatus comprising first and second stator assemblies and a rotor assembly mounted coaxially with respect to each other, the first stator assembly being upstream of the second stator assembly, and the second stator assembly being upstream of the rotor assembly, the rotor assembly comprising an annular array of rotor blades, and each stator assembly comprising an annular array of stator vanes, each vane having a leading edge and a trailing edge wherein the vanes of one of the stator assemblies are movable relative to the vanes of the other of the stator assemblies between a first condition in which each of the vanes of the second stator assembly is substantially in aerodynamic alignment with a respective one of the vanes of the first stator assembly, and the exit angle of gas from the stator assemblies is relatively high, and a second condition in which the exit angle of gas from the stator assemblies is relatively low and wherein the vanes of the second stator assembly are arranged wholly downstream of the vanes of the first stator assembly, and the vanes of the second stator assembly can be moved between the first and second conditions across the trailing edge of the respective vanes of the first stator assembly.

2. A rotary apparatus according to claim 1 wherein when the stator assemblies are in the second condition, the vanes of the first and second stator assemblies are out of aerodynamic alignment with each other.

3. A rotary apparatus according to claim 1 wherein the first stator assembly is fixed and the second stator assembly is translatable relative to the first stator assembly.

4. A rotary apparatus according to claim 1 wherein the vanes of the second stator assembly extend downstream beyond the trailing edges of the vanes of the first stator assembly.

5. A rotary apparatus according to claim 1 wherein, in the first condition, the vanes of the second stator assembly are arranged such that the leading edge of each vane of the second stator assembly is provided in aerodynamic close proximity to, or in abutment with, the trailing edge of the respective vane of the first stator assembly.

6. A rotary apparatus according to claim 1 wherein vanes of the first and second stator assemblies are configured such that, in the first condition, the exit angle of the gas from the stator assemblies is controlled by the vanes of the first stator assembly and by the vanes of the second stator assembly, whereby said gas is directed, in use, from the stator arrangement at a relatively high exit angle, and in the second condition, the exit angle of said gas is controlled to a major degree by the vanes of the first stator assembly only, whereby said gas is directed, in use, from the stator assemblies at a relatively low exit angle.

7. A rotary apparatus according to claim 1 wherein the first and second stator assemblies are translatable to any condition intermediate the first and second conditions.

8. A rotary apparatus according to claim 1 wherein, when the stator assemblies are in the second condition, the vanes of the second stator assembly are arranged intermediate the vanes of the first stator assembly.

9. A rotary apparatus according to claim 8 wherein, when the stator assemblies in the second condition the vanes of the second stator assembly are arranged generally parallel, in use, to the flow of gas around the vanes of the first stator assembly.

10. A rotary apparatus according to claim 8 wherein, when the stator assemblies are in the second condition, the vanes of the second stator assembly are arranged substantially mid-way between the adjacent vanes of the first stator assembly.

11. A rotary apparatus according to claim 1 wherein the leading edge of each vane of the second stator assembly overlaps the trailing edge of a respective one of the vanes of the first stator assembly, and the vanes of the second stator assembly can be translated between the first and second conditions across the respective paths defined between adjacent vanes of the first stator assembly.

12. A rotary apparatus according to claim 1 wherein the first stator assembly includes fixed support means to support the vanes thereof, and the second stator assembly includes translatable support means to support the vanes thereof.

13. A rotary apparatus according to claim 12 wherein the fixed and the translatable support means each comprises an inner annular member extending radially inwardly of the respective vanes, and an outer annular member extending radially outwardly of the respective vanes.

14. A rotary apparatus according to claims 13 wherein seal means is provided between the first and second stator assemblies.

15. A rotary apparatus according to claim 14 wherein the seal means extends between the fixed support means and the translatable support means.

16. A rotary apparatus according to claim 15 wherein the seal means comprises a first seal extending between the inner member of the fixed support means and the translatable support means, and between the outer member and the second stator assembly.

17. A rotary apparatus according to claim 13 wherein a bearing is provided between the fixed support means and the translatable support means.

18. A rotary apparatus according to claim 17 wherein the bearing is provided between the inner annular member and the translatable support means, the inner annular member being provided with a flange extending towards the translatable support means, and the bearing being provided between the translatable support means and said flange.

19. A rotary apparatus according to claim 13 wherein connecting members are provided between the fixed support means and the translatable support means.

20. A rotary apparatus according to claim 19 wherein the connecting members are circumferentially uniformly spaced around the stator arrangement.

21. A rotary apparatus according to claim 14 wherein a plurality of connecting members are provided radially inwardly of the stator vanes and a plurality of further connecting members are provided radially outwardly of the stator vanes.

22. A rotary apparatus according to claim 21 wherein the radially inward connecting members extend between said inner annular members of the fixed and translatable support means, and the radially outwardly connecting members extend between said outer annular members of the fixed and translatable support means.

23. A rotary apparatus according to claim 19 wherein each connecting member is angled relative to the principal axis of the rotary apparatus such that each connecting member extends substantially parallel to the direction of aerofoil lift on the vanes of the second stator assembly.

24. A rotary apparatus according to claim 19 wherein the connecting members comprise a plurality of plates, each plate being flexible in the circumferential direction to allow said relative translation of the first and second stator assemblies between said first and second conditions.

25. A rotary apparatus according to claim 19 wherein the connecting members comprise a plurality of rods pivotally mounted at each end thereof to the respective first and second stator assemblies.

26. A rotary apparatus according to claim 19 wherein the connecting members comprise a circumferentially extending struts arranged in compression between the first and second stator assemblies.

27. A rotary apparatus according to claim 26 wherein the translatable support means comprises a flange extending upstream of the second stator assembly, and having thereon a radially outwardly extending lip, the fixed support means including a radially inwardly supporting lip and the struts extending between said lips.

28. A rotary apparatus according to claim 1 in the form of a turbine or a compressor.

29. A rotary apparatus according to claim 1 in the form of an intermediate pressure turbine.

30. A gas turbine engine including a rotary apparatus as claimed in claim 1.

* * * * *